United States Patent [19]

Srdinko

[11] Patent Number: 4,728,146
[45] Date of Patent: Mar. 1, 1988

[54] LIFTING AND/OR SLIDING ROOF FOR INSTALLATION IN VEHICLES

[75] Inventor: Klaus-Peter Srdinko, Unterschleissheim, Fed. Rep. of Germany

[73] Assignee: Webasto-Werk W. Baier GmbH & Co., Gauting, Fed. Rep. of Germany

[21] Appl. No.: 53,587

[22] Filed: May 19, 1987

Related U.S. Application Data

[63] Continuation of Ser. No. 831,858, Feb. 24, 1986, abandoned.

[30] Foreign Application Priority Data

Feb. 23, 1985 [DE] Fed. Rep. of Germany ....... 3506408
Dec. 23, 1985 [DE] Fed. Rep. of Germany ....... 3545973

[51] Int. Cl.$^4$ .............................................. B60J 7/08
[52] U.S. Cl. ..................................... 296/216; 296/218
[58] Field of Search ............... 296/216, 218, 221, 222, 296/84 D

[56] References Cited

U.S. PATENT DOCUMENTS

| | | | |
|---|---|---|---|
| 3,078,122 | 2/1963 | Werner | 296/222 |
| 3,972,558 | 8/1976 | Horn | 296/224 |
| 4,005,901 | 2/1977 | Lutke et al. | 296/224 X |
| 4,138,155 | 2/1979 | Chrysler | 296/218 |
| 4,142,761 | 3/1979 | Lutz et al. | 296/218 X |
| 4,154,474 | 5/1979 | Hough et al. | 296/218 |
| 4,206,536 | 6/1980 | Hammond et al. | 296/84 D |
| 4,251,104 | 2/1981 | Holt | 296/216 |
| 4,296,961 | 10/1981 | Hunt et al. | 296/218 |
| 4,333,680 | 6/1982 | Wolf et al. | 296/216 |
| 4,585,269 | 4/1986 | Lievesley | 296/214 |

FOREIGN PATENT DOCUMENTS

| | | | |
|---|---|---|---|
| 14798 | 9/1980 | European Pat. Off. | |
| 1162703 | 8/1960 | Fed. Rep. of Germany | 296/222 |
| 2508487 | 7/1976 | Fed. Rep. of Germany | |
| 2710193 | 8/1978 | Fed. Rep. of Germany | |
| 3114502 | 2/1982 | Fed. Rep. of Germany | |
| 3128817 | 1/1983 | Fed. Rep. of Germany | |
| 3241652 | 5/1984 | Fed. Rep. of Germany | 296/218 |
| 537385 | 12/1955 | Italy | 296/210 |
| 2068303 | 8/1981 | United Kingdom | 296/222 |

Primary Examiner—Dennis H. Pedder
Attorney, Agent, or Firm—Sixbey, Friedman & Leedom

[57] ABSTRACT

A roof having a cover that is displaceable by lifting and/or sliding and/or removable for vehicles has a frame that, as a whole, is disposed below the solid roof skin of the vehicle and is supported against the interior side thereof. A seal, running along the edge of a roof opening, is borne by the frame. On the frame, a liftable and/or slidable and/or removable cover is mounted, the edge of which in the closed position of the cover engages onto the seal. The frame is connected with the roof skin only by a clamping arrangement that presses the frame against the underside of the roof skin.

33 Claims, 11 Drawing Figures

LIFTING AND/OR SLIDING ROOF FOR INSTALLATION IN VEHICLES

This application is a continuation of application Ser. No. 831,858, filed Feb. 24, 1986, abandoned.

BACKGROUND AND SUMMARY OF THE INVENTION

The invention relates to a lifting and/or sliding roof suitable for installation into vehicles, with a frame, as a whole, supported against the inside of the solid skin of the roof, a seal carried by the frame and running along the edge of a roof opening and a cover which is held on the frame, which may be tilted up and/or slid-back and/or removed, the edge of the cover seating onto the seal in its position closing the roof opening.

In the case of a known roof of this type (FIG. 6 of U.S. Pat. No. 3,972,558), the frame is riveted together with the skin of the roof. The heads of the rivets lying on the outside of the skin of the roof are covered up by means of a vinyl covering. The known arrangement, to be sure, has a very low profile above the solid skin of the roof. The riveting together of the frame with the skin of the roof, however, makes installation difficult. In the case of drilling of the through-holes for rivets, the painted finish of the vehicle will easily be damaged. These through-holes, moreover, form starting places for rust. The vinyl roof covering required for covering up the otherwise visible heads of the rivets is frequently undesirable or in any case is not present in the case of a vehicle that is to be retrofit equipped with a lifting and/or sliding roof.

In the case of another arrangement (European Pat. No. 0 014 798) that has a flat disposition above the skin of the roof, a mounting ring is inserted into the roof opening to which a frame carrying a cover is then riveted. The mounting ring, in the area of a forward flange and of two lateral flanges which fit from above against the edge of the roof opening, has attaching bolts facing downwards for the reception of which holes will have to be drilled into the skin of the roof. This again is cumbersome and promotes the formation of rust. Beside this, it has been known (German Pat. No. 32 41 652) to develop the frame in two parts, whereby one frame part fits against the outside and the other frame part fits against the inside of the skin of the roof, and whereby the two parts of the frame are screwed together. This known bipartite roof frame extends relatively highly above the roof skin and the necessary screwing together of both parts of the frame makes the mounting time consuming.

Mounting, to be sure, is simplified in the case of another known roof (German Offenlegungsschrift No. 31 20 817), which has a one-piece frame, the lower portion of which is guided through the roof opening from above. The part of the frame lying, in the mounted state, above the skin of the roof carries a seal. This seal, in the installed condition, is pressed against the outside of the roof skin by means of resilient spring clips which are supported, on the one hand, against the frame and, on the other hand, against the underside of the roof skin. This construction produces an even higher profile above the roof skin. This, however, is undesirable for reasons of design and with a view to achieving a low coefficient of drag ($C_D$).

The present invention has a primary object of creating a lifting and/or sliding roof of the above-mentioned type wherein an especially low projection of the construction above and below the solid roof skin is achieved along with a further simplified mounting.

This object has been achieved, according to preferred embodiments of the invention, through the fact that the connection of the frame with the skin of the fixed roof is attained solely by a clamping connection holding the frame against the inside of the roof skin.

In the case of the roof according to the invention, no parts of the frame project upward beyond the roof skin. This frame may be held flat without any difficulty. Consequently, the height of the roof construction may be kept especially low. At the same time, the mounting is decisively facilitated by the clamping connection provided. It is not necessary, e.g., in the case of retrofit installation of the lifting and/or sliding roof, to make penetrating holes, for the attaching elements, such as screws or rivets, in the skin of the roof. The production of the clamping connection may be safely carried out without problems even by laymen. Independent of whether the installation takes place with production of the vehicle or subsequent thereto, there is no need to apply other attaching parts on the roof skin, such as by welding.

For connection of the frame with the roof skin, a trim ring with a flange may be provided that is supported in the marginal area of the roof opening against the exterior of the solid roof skin and projects essentially horizontally outwardly with the result that the trim ring, itself, is in a clamping connection with the frame that holds the edge of the roof opening between the trim ring and frame. Such a construction is especially suitable for retrofit installation of the lifting and/or sliding roof. Only the flange of the trim ring extends above the roof skin and this flange may be kept flat without any difficulty.

In accordance with another development of the invention, which is particularly suitable for assembly line production of the vehicle, the roof skin is downturned along the edge of the roof opening, and then the downturned area of the roof skin forms a support for a clamping part. Such a form of construction eliminates the need for a trim ring and there are no attaching parts visible from the exterior.

In the interest of increased safety, the clamping connection is developed, preferably, as a locking clamping connection, for example, by the use of locking projections. For the production of the clamping connection, the trim ring may engage directly with the frame. Instead of that, it is also possible to bring the trim ring and the frame into engagement with one another by way of at least one additional clamping part. In the first mentioned case, the trim ring may have a bridge reaching through the roof opening, which is simply locked into a complementary groove of the frame. This groove may extend essentially perpendicularly in relation to the flange resting on the roof skin. In a modified embodiment, a bridge, which may be locked into the groove, may also run below the edge of the roof opening at a distance from the underside of the roof skin. The frame is developed preferably in one part, although, for example, in the interest of a simplified production of the frame, multi-part frame developments may also come into consideration. Even in the case of multi-part frames, however, the frame as a whole does not project upwardly beyond the solid roof skin. Basically, any kind of material that will fulfill the purpose may be used for the production of the frame, for example, a light metal profile or a sheet metal profile. Preferably, the frame consists at least essentially of plastic.

For a further simplification of the mounting, connecting means for a plate-shaped headliner may be put effectively onto the frame. At the same time, advantageously, a covering strip may be provided which reaches from below the edge of the headliner facing the roof opening thereover, for example, an elastically deflectable lip which in the unstressed condition points from the frame transversely upwards in the direction of the roof skin, is used. Instead of that, it is also possible that a clamping strip for clamping down the edge of a stretch-type headlining is provided on the side of the frame facing the roof opening. In this manner, a neat junction between the headlining and the frame may be produced independently of the type of vehicle headlining provided in a specific case.

A further simplification of the mounting will be achieved whenever the seal for the cover is fixed on the frame by way of a plug-in connection; that is, the seal may effectively be provided with at least one projecting profile shaped for engaging into a complementary recess of the frame. Instead of or in addition to such a connection, the seal may be secured by means of a trim ring. As a result of the type of attachment of the seal, the level in height of the seal does not change, at the places of transition between the lateral parts of the frame and the forward or the rear part of the frame, that is to say, the seal fits evenly against the closed cover. The seal may, otherwise, have a first section made of relatively soft material, for the sealing engagement against the lid in its closed position, and a second section, for example, vulcanized onto it, made of relatively hard material, which serves as a stop that determines the height of the cover in the closed position of said lid.

Effectively, in the area intended to fit against the inside of the skin of the roof, the frame is provided with at least one recess for a sealing and/or adhesive mass.

The trim ring may have a number of different cross-sectional shapes. Especially effective is an essentially Z-shaped or an essentially C-shaped cross section. Various raw materials may be used for the trim ring. Preferably, the trim ring is made of metal. Also plastic trim rings are suitable in the case of a corresponding dimensioning. In order to be able to easily bend the trim rings, especially trim rings with Z-, C- or similar cross sections, to the contour of a roof opening, the trim ring may be provided, advantageously, with a sequence of slits which run essentialy perpendicularly in relation to the longitudinal extent of the trim ring and start out from the edge of said trim ring which lies away from the flange that engages against the outside of the roof skin.

The clamping part is effectively supported on a flange of a downturned edge of the roof skin or the trim ring and is located below the solid roof skin and essentially parallel to it. Advantageously, the clamping part may have an essentially V-shaped cross section, one leg of which fits against the downturned edge of the roof skin or against the trim ring, and the other leg of which seats, at its upper edge, below a projection of the frame.

These and further objects, features and advantages of the present invention will become more obvious when the following description, when taken in conjunction with the accompanying drawings which show, for purposes of illustration only, several embodiments in accordance with the present invention.

DETAILED DESCRIPTION OF THE PREFERRED EMBODIMENTS.

Figure 1:
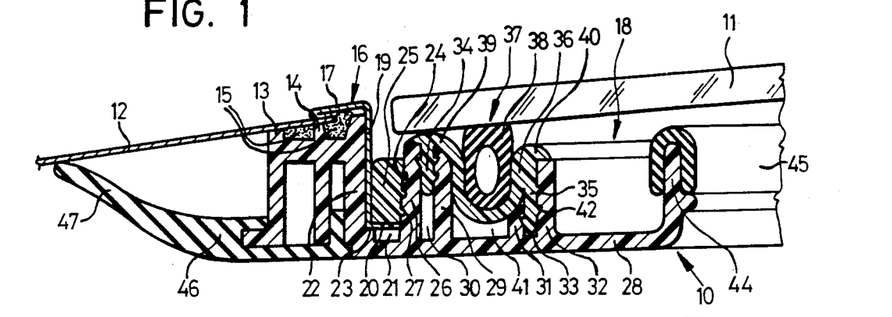
FIG. 1 shows a partial sectional view of a lifting roof developed according to the invention taken along the line I—I of FIG. 2.
Figure 2:
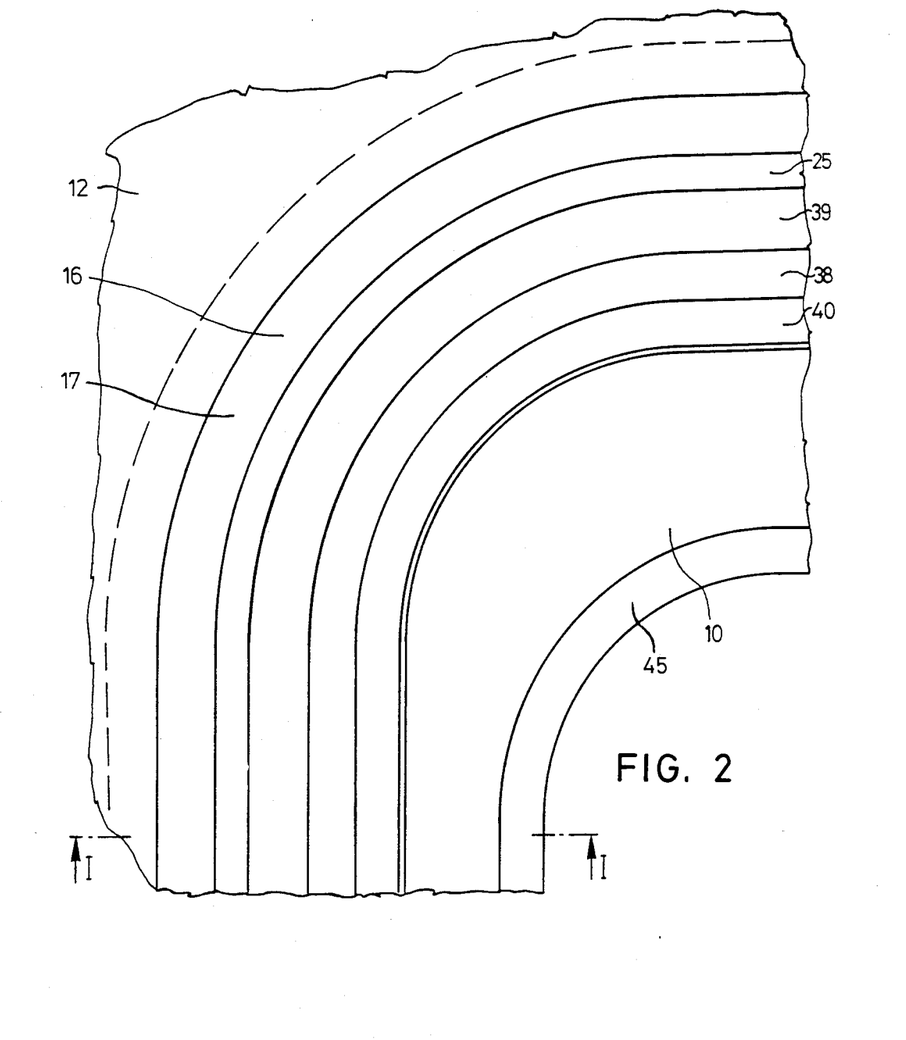
FIG. 2 shows a partial top view of the roof according to FIG. 1 without the lid.

The lifting roof according to FIGS. 1 and 2 has a one-piece plastic frame 10 which carries, in a manner known per se and in a manner not shown in further details, a removable cover 11, for example, made of transparent or translucent material, which may be tilted out of a position shown closing a roof opening as a result of a pivoting movement around an axis lying near its forward edge, so that its rear edge is raised over the solid roof skin 12. The tilting out may take place, for example, by way of a folding handle, a hand-operated turning handle or a motor driven arrangement (for example, in the manners known from the German Pat. No. 25 08 487, German Pat. No. 27 10 193 or German Pat. No. 31 14 502). It is also noted that, in the following description, the terms interior and exterior refer to areas below and above roof skin 12, while the terms inner and outer refer to relative positions that are closer to and further from the center of the roof opening, respectively.

In the mounted state illustrated in the figures, the frame 10 is seated below the roof skin 12. Projections 13, 14 of frame 10 engage against the underside of the roof skin 12. The projections 13, 14 define groove-shaped receiving spaces for sealing or adhesive masses 15. A trim ring 16, which has an essentially Z-shaped cross section and which is, for example, a sheet metal or extruded profile part, has an upper flange 17 that projects essentially horizontally outwardly over and against the roof skin 12 in the marginal area of a roof opening 18. A bridge 19 of the trim ring 16 extends through the roof opening 18 substantially perpendicular to flange 17. From the lower end of the bridge 19, and additional flange 20 is provided that extends inwardly substantially parallel to flange 17. The bridge 19 and the flange 20 are disposed within a groove 21 of the frame 10, with the bridge 19 fitting against the wall 22, that defines the outer wall of the groove 21. The flange 20, at its edge adjacent the bridge 19, rests on a shoulder 23 of the frame wall 22. A clamping part 25 provided with locking projections 24, which may be, for example, a strip cut from profiled running-length stock, is pressed into the groove 21 into engagement with the flange 20. The clamping part 25, at the same time, fits laterally against the bridge 19 and a wall 26 defining the inner wall of the groove 21, that faces opposite thereto. The locking projections 24 engage with complementary engaging recesses 27 of the inner wall 26, thereby securing clamping part and, as a result, the trim strip 16 in place.

The frame wall 26 also forms, at its side opposite groove 21 and together with a wall 29, a gap 30 which runs in parallel thereto and upwardly from the bottom wall 28 of the frame 10. Inwardly at a distance from the walls 26, 29, there are two additional, parallel vertical walls 31, 32, in which a gap 33 is defined. The gaps 30, 33 serve for the respective reception of an outer plug profile 34 and an inner plug profile 35 which project downwardly from a first, relatively hard, part 36 of a seal that runs along the peripheral area of the roof opening designated 37 as a whole. A second, relatively soft part 38 of the seal 37, which has a hollow chamber in the illustrated example of this embodiment, is firmly connected with the hard part 36; preferably, it is vulcanized onto it. The hard part 36 has a cross section similar to a M, wherein an outer bridge 39 of the hard part 36 reaches higher than an inner bridge 40 of this part. The soft part 38 of the seal 37 is received by a groove 41 bounded by the bridges 39, 40 and projects, in its relaxed state, upwardly beyond the higher, outer bridge 39. The plug profiles 34, 35 carry locking projections 42 which engage into corresponding locking recesses of the vertical walls of the gaps 30, 31.

Whenever the cover 11 is put into the closed position illustrated in FIG. 1, the soft part 38 of the seal 37 is compressed until the edge of the lid 11 rests on the upper end of the outer bridge 39. Thus, the outer bridge 39 of the hard part 36 of the seal 37 serves as a cover stop that determines the height of the cover 11 in its closed position.

A clamping strip 45 of inverted U-shape cross section may be put onto the innermost wall 44 of the frame 10. The clamping strip can serve to clamp the edge of a stretch-type headlining at the perimeter of the opening of the roof (in a manner as shown for a headlining 71 in FIGS. 3 and 4). Instead of or in addition to strip 45, it is also possible for an overlay lip element 46 to be attached onto the outer side of the frame 10 which profile has an elastically deflectable lip 47 which runs from the frame 10, in the relaxed stage, transversely upwards in the direction of the skin of the roof.

For the retrofit installation of the lifting roof as explained, the roof opening 18 is cut into the skin of the roof 12 without any further processing of the roof skin taking place, for example, the drilling of the holes for attachment. The sealing or adhesive masses 15 are inserted into the receiving spaces defined by the projections 13, 14. Then, the frame 10 is forced from below against the underside of the skin of the roof, whereby the masses 15, preferably, create a preliminary fixation. The trim ring 16 is inserted from above into the roof opening 18 so that upper flange 17 fits against the exterior of the roof skin 12. Then, the clamping part 25 is forced into the groove 21, between the bridge 19 and the wall 26 of the frame 10, so that it fits onto the lower flange 20 of the trim ring 16. At the same time, projections 24 of clamping part 25 engage in the locking recesses 27. Possibly by means of the clamping strip 45, a headlining for the vehicle (with a cut-out corresponding to the roof opening 18) will also be clamped in. Therefore, the lifting roof, as described, may be mounted in the shortest possible time without any problems, even by laymen. Furthermore, there is virtually no projection of the lifting roof beyond the roof skin 12.

Figure 3:
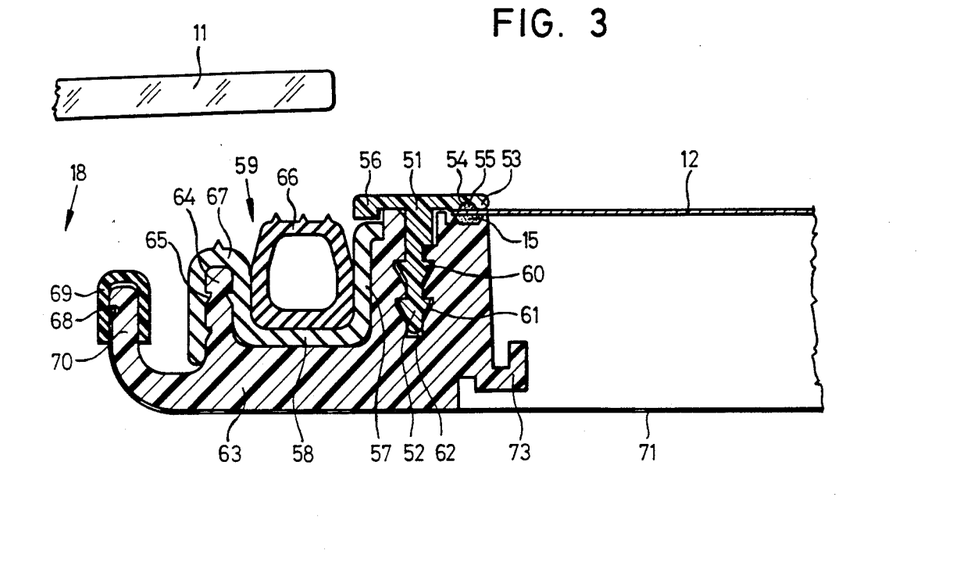
FIGS. 3, 4, and 5 show partial sectional views through varied forms of embodiments of lifting roofs.

In the case of the modified embodiment according to FIG. 3, a trim ring 51 has been provided which has an essentially T-shaped cross section. Trim ring 51 has a flange 53 extending outwardly from a vertical leg 52 and fitting against the exterior of the roof skin 12. On the underside of the flange 53, there is a groove 54 for the reception of a sealing or adhesive mass 55. Trim ring 51 also has a flange 56 protruding inwardly from the vertical leg 52 in the direction of the roof opening 18 and overlapping an outer bridge 57 of a relatively hard part 58 of a seal 59, as a result of which the seal 59 in the installed condition of the roof is secured additionally by the trim ring 51. The vertical leg 52 has been produced with locking projections 60. The locking projections 60 fit into locking recesses 61 in the walls defining a groove 62 of a plastic frame 63, whenever the roof is mounted on the vehicle.

The frame 63 is supported, in the same way as the frame 10, against the interior side of the roof skin 12 and, in a manner known per se and not illustrated in detail, it carries the cover 11. The portion of the frame 63 coming into engagement with the roof skin 12 is provided with a groove-shaped receiving space for the sealing or adhesive mass 15. The hard part 58 of the seal 59 is mounted onto an upright bridge 64 of the frame 63 and is held there by way of locking projections 65. As in the case of the seal 37, the seal 59 has a soft part 66 with a hollow chamber, this soft part 66 being firmly connected with the hard part 58 and seals against the cover 11 in its closed position. The height of the closed cover 11, in the case of this embodiment, is determined by the section 67 of the hard part 58 of the seal 59 that is seated on the bridge 64 in that cover 11 will compress soft seal part 66 until it abuts hard part 58.

A clamping strip 69, provided with a locking projection 68, may be put onto an inner wall 70 of the frame 63 in order to fix the stretch-type headlining indicated at 71. The vehicle, however, may also be equipped with a hard or soft, plate-shaped headliner as illustrated in the FIGS. 5 and 7 at 72. In such a case, in order to create a neat junction between the headliner and frame, an overlay lip element 74 with a lip 75, similar to the overlap lip element 46, is mounted onto a hook 73, that is disposed on the outside of the frame 63 and extends away from the roof opening, by the way of a holding device in the form of a supporting part 76. The lip 75 may be fixedly attached, for example vulcanized-on, to supporting part 76, as this is likewise shown in the FIGS. 5 and 7.

Figure 4:
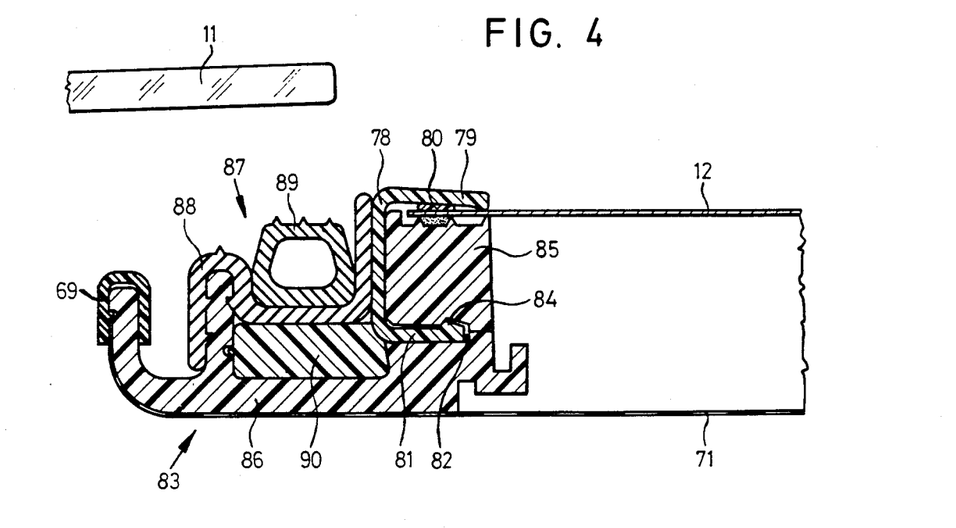

In the case of the embodiment according to FIG. 4, the trim ring 78 has an essentially C-shaped cross section. An upper flange 79 of the trim ring 78 fits, for example with an interposed sealing strip 80, against the exterior of the roof skin 12. At a distance and essentially parallel to the flange 79, a lower flange 81 of the trim ring 78 extends which, during mounting of the roof, is plugged into an essentially horizontal slot 82 of a plastic frame 83 and is fixed there by way of a locking projection 84. In the interest of an easier production of the frame 83, the latter may consist of two parts 85, 86 which are joined during assembly by, for example, being screwed together with one another, being welded together by ultrasound or glued together. A seal 87 is provided that is made of a hard part 88 and a soft part 89, and which corresponds, for the most part, to the seal 59. Below the sealing ring 87, in this embodiment, a clamping part in the form of a plastic wedge 90 is seated, the task of which is to secure the trim ring 78. Otherwise, the construction and method of functioning of the roof conform with that of the embodiment according to FIG. 3.

Figures 5, 6, 7:
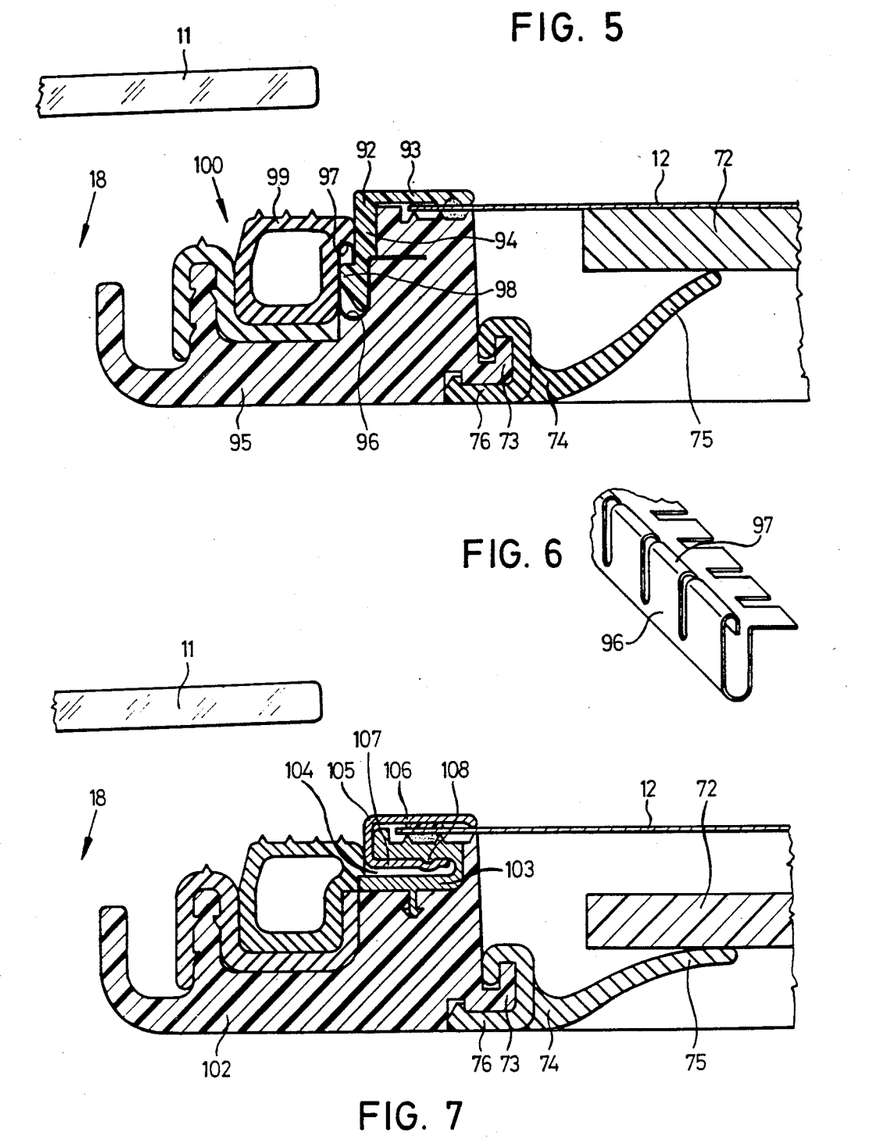
FIG. 6 shows a perspective partial view of a resilient holding profile provided in the case of the lifting roof according to FIG. 5.
FIG. 7 shows a partial view similar to FIGS. 3 and 5 for a further modified lifting roof.

A further similar embodiment is shown in FIG. 5. There, a trim ring 92 has an essentially reversed L-shaped cross section. Trim ring 92 has a flange 93 that projects outwardly so as to fit against he exterior side of the roof skin 12, while it has a vertical leg 94 extending essentially perpendicularly downward from the flange 93 and into roof opening 18. A spring strip 96 (FIG. 6) is inserted, for example, embedded during molding, into a one-piece plastic frame 95. The spring strip 96 has an inverted U-shaped holding projection 97. During installation of the roof, a locking projection 98 on leg 94 is pushed below this holding projection 97 to secure the trim ring 92. A soft part 99 of a bipartite seal 100 overlaps the holding projection 97. In the case of this embodiment, by way of example, instead of the stretch-type headlining 71 shown in the FIGS. 3 and 4, a plate-shaped headliner 72 has been provided. As a result, the overlay lip element 74 is put onto the hook 73 of the frame 95 while the lip 75 fits over the adjoining edge area of headliner 72, and the clamping strip 69 may be eliminated. Otherwise, this form of embodiment, again, corresponds to the previous embodiments.

In the case of the embodiment according to FIG. 7, a clamping profile 103, preferably formed of metal, is connected with a plastic frame 102, for example, by being embedded during molding thereof. Clamping profile 103 has a C-shaped cross section that forms a slot 104 that opens inwardly toward the roof opening 18. A trim ring 105, with a likewise essentially C-shaped cross section, is attached so that an upper flange 106 engages against the exterior of the skin of the roof 12, while the lower flange 107, in its mounted state, engages with the slot 104 and is secured therein by means of a locking projection 108 of the clamping profile 103.

FIG. 7 shows a headliner 72 lying at a distance below the roof skin 12. It can be recognized that the flexible lip 75 of the overlay lip element 74 also permits a neat covering of the junction between the headliner and the frame in this case as well. Consequently, basically the same construction may be provided for vehicles with variously shaped headlinings.

Figure 8:
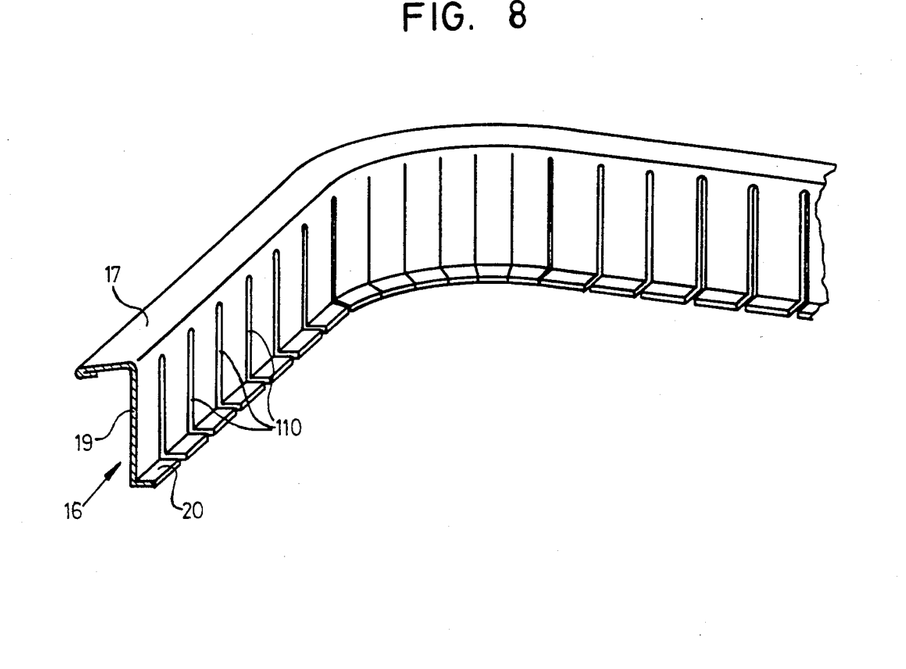
FIG. 8 shows a perspective partial view of the trim ring used in the case of the embodiment according to FIG. 1.

From the partial perspective view of the trim ring 16 according to FIG. 8, it can be recognized that the trim ring is provided with a sequence of slits 110. The slits 110 run essentially perpendicular to the longitudinal (circumferential) extent of the trim ring 16. The slits 110 begin at the edge of the flange 20 of trim ring 16 and they extend through the flange 20 and through a major extent of the bridge 19. As a result of the slits 110, the trim ring 16 may be brought, without difficulty, into the shape illustrated in the FIGS. 2 and 8 in which shape it follows the corners of the roof opening 18, thus facilitating formation of the ring from strip stock. Corresponding slits are provided, preferably, also in the case of the trim ring embodiments according to the FIGS. 4 and 7.

Figure 9:
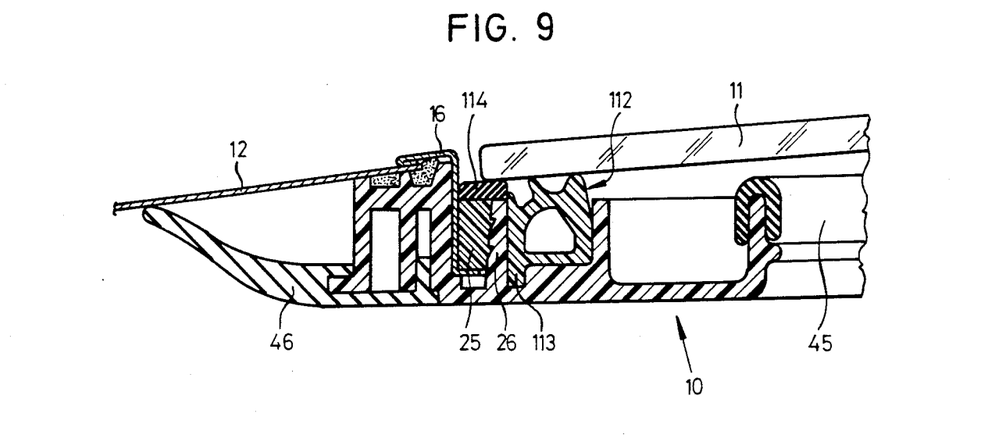
FIG. 9 shows a partial cut through a further modified embodiment of a lifting roof.

Another embodiment, shown in FIG. 9, is essentially similar to that according to FIG. 1. However, in this case, in place of the bipartite seal 37, a single component seal 112 has been provided which is formed with a projection 113 that engages into a complementarily shape recess in frame 10. The clamping element 25 is dimensioned such that it terminates essentially flush with the upper edge of the wall 26. An overlay 114 is connected with the upper end of the clamping part 25. Overlay 114 preferably is made of a relatively hard material, and, in the assembled condition, rests on the upper edge of wall 26. Overlay 114 permits a particularly easy handling of the clamping element 25 during the assembly while, at the same time, the overlay 114 may take over the function of a stop determining the height of the cover 11 in its closed position. Possibly, the clamping part 25 and the overlay 114 may also be formed as a single part.

Although the above-described roof embodiments are suitable for retrofit installation, it should be appreciated that they may also be built directly into the body of the vehicle on the production line at the vehicle manufacturer.

Figure 10:
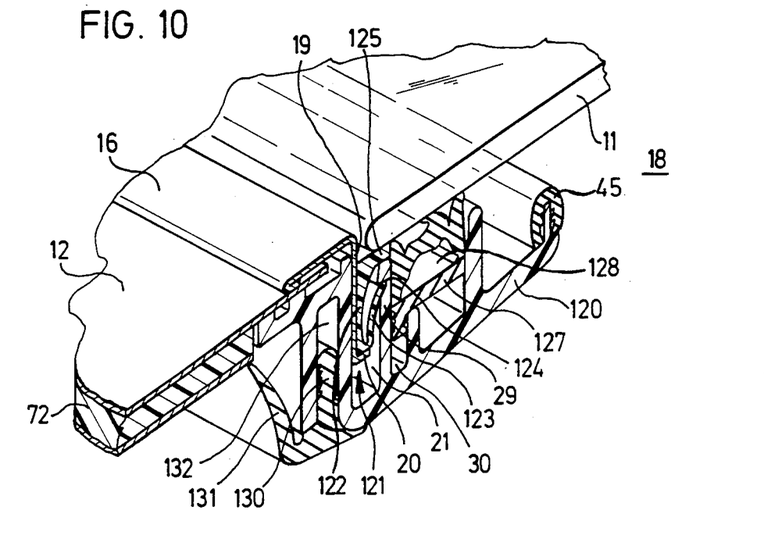
FIG. 10 is a perspective sectional view of a lifting roof in accordance with the further embodiment of the invention wherein a trim ring is provided in the forward area of the roof.

In the case of the embodiment according to FIG. 10, a trim ring 16 according to FIGS. 1 and 9, as well a frame 120 similar to that of the embodiment of FIG. 9, have been provided. The trim ring 16, with its bridge 19 and its flange 20, extends into the groove 21 of the frame 120. On the flange 20 of the trim ring 16, running essentially in parallel to the solid roof skin 12, a strip-shaped clamping part 121 with an essentially V-shaped cross section is supported. The clamping part 121 has an outside leg 122 and an inside leg 123. The outside leg 122 fits against the bridge 19 of the trim ring 16, while the inside leg 123, at its upper edge, engages under a downwardly and outwardly angled projection 124 that is disposed on the upper end of the wall 29. The outside leg 122 of the clamping part 121, at its upper end, is formed into a flange 125 that is directed inwardly and which rests on top of the upper edge of the wall 29. The top side of flange 125 forms an essentially rigid supporting surface for the cover 11. A plug profile 127 of a sealing installation designated 128, as a whole, is plugged into the gap 30 of the frame 120. A plug profile 130 of an overlay lip element 131, corresponding functionally to the overlap lip element 74 of FIGS. 5 and 7, engages with a frame slot 132 that opens downwardly.

Figure 11:
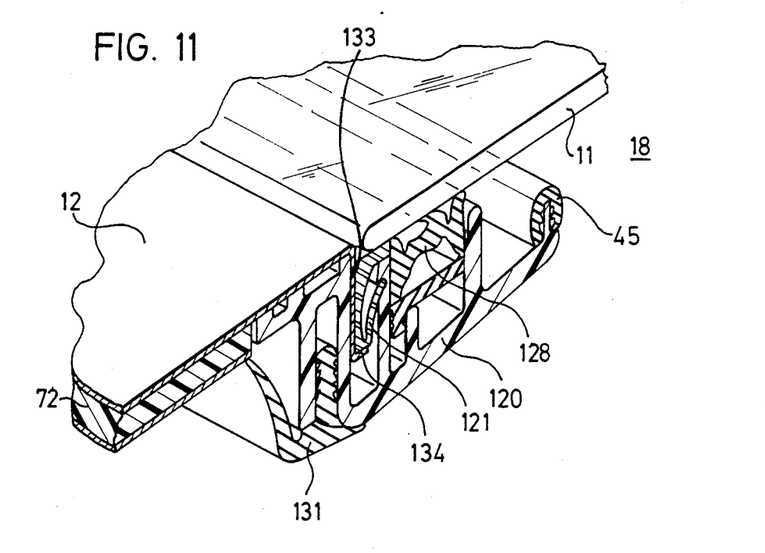
FIG. 11 is a perspective sectional view, similar to FIG. 10, for an embodiment without a trim ring.

The embodiment shown in FIG. 11 conforms with that of FIG. 10 with the exception that the solid roof skin 12 is then downturned along the edge of the roof opening 18 in such a way that the roof skin, itself, forms a bridge 133 and a flange 134. The bridge 133 and the flange 134 correspond, respectively, to bridge 19 and flange 20 of the trim ring 16 shown in FIG. 10. This embodiment is particularly suitable for assembly line installation at the vehicle manufacturer since it eliminates the need for the trim ring.

While various embodiments have been shown and described in accordance with the present invention, it should be understood that the invention is not intended to be limited thereto, but rather is susceptible to numerous changes and modifications as known to those skilled in the art. Therefore, the present invention should be construed as covering all such changes and modifications as are encompassed by the scope of the appended claims.

I claim:

1. A displaceable roof, for installation into vehicles, having a frame for seating against the underside of a roof skin of a vehicle so as to be disposed below the roof skin, a seal running along the peripheral area of a roof opening formed in the roof skin and a cover mounted on the frame for displacement between a position closing the roof opening, wherein an edge of the cover is placed on the seal, and at least one position at least partially uncovering the roof opening; wherein a clamping connection is provided as a means for connecting the frame with the roof skin by pressing the frame against the underside of the roof skin, said clamping connection comprising a trim ring having an outer portion for overlying the exterior of the roof skin and an inner portion for being secured with the frame, said frame having a recess with at least one holding detent and means lockingly engageable with said detent of said frame by being inserted through an open end of the recess for holding said inner portion of the trim ring to said frame in a manner establishing the clamping connection of the frame to the roof skin with the roof skin being disposed between the frame and the outer portion of the trim ring, wherein the frame is continuous at its underside in an area underlying the recess in a manner closing said recess from below and limiting access to said recess and said detent to via said open end.

2. Roof as in claim 1, wherein the outer portion of the trim ring is a flange that projects essentially horizontally in a manner for overlying the exterior of the roof skin at a marginal area of the roof opening.

3. Roof as in claim 2, wherein the clamping connection further comprises a locking member.

4. Roof as in claim 2, wherein the trim ring engages directly with the frame.

5. Roof as in claim 4, wherein the trim ring has a bridge portion for extending through the roof opening and being sized for fitting into a complementary slot of the frame.

6. Roof as in claim 5, wherein the bridge of the trim ring extends substantially perpendicularly in relation to the flange of the trim ring for overlying the skin of the roof.

7. Roof as in claim 5, wherein the bridge of the trim ring has a lower flange at a distance from and extending substantially parallel to the flange for overlying the skin of the roof.

8. Roof as in claim 2, wherein the locking means comprises at least one clamping part for bringing the trim ring into engagement with the frame.

9. Roof as in claim 2, wherein the frame is formed of one part.

10. Roof as in claim 2, wherein the frame is formed substantially of plastic.

11. Roof as in claim 1, wherein the frame is provided with connecting means for a plate-shaped headliner.

12. Roof as in claim 11, wherein a clamping strip for fastening an edge of a stretch-type headlining is provided on the frame at an inner circumferential side thereof.

13. Roof as in claim 12, wherein the clamping strip is of an inverted U-shaped cross section and is seated on an edge of an inner wall of the frame.

14. Roof as in claim 11, wherein an overlay lip element is mounted onto the frame for covering an inner edge of the headliner.

15. Roof as in claim 14, wherein the overlay lip element has an elastically deflectable lip which extends in a upwardly and outwardly slanting manner from the frame.

16. Roof as in claim 2, wherein the seal is fixed in the frame by way of a plug-in connection.

17. Roof as in claim 16, wherein the seal is provided with at least one locking projection engaging with a complementary recess of the frame.

18. Roof as in claim 17, wherein the seal is also secured by means of the trim ring.

19. Roof as in claim 16, wherein the seal has a first part made of a relatively soft material for sealing against the cover in its closing position and a second part made of relatively hard material, which acts as a stop for determining the height of the cover in the closing position.

20. Roof as in claim 2, wherein a portion of the frame for fitting against the underside of the roof skin is provided with at least one recess for a mass having at least one of sealing and adhesive properties.

21. Roof as in claim 2, wherein the trim ring has an essentially Z-shaped cross section.

22. Roof as in claim 2, wherein the trim ring has an essentially C-shaped cross section.

23. Roof as in claim 2, wherein the trim ring consists of sheet metal.

24. Roof as in claim 2, wherein the trim ring is provided with a sequence of slits which run essentially perpendicularly in relation to the longitudinal extent of the trim ring and which start out from an edge of the trim ring which lies away from the flange overlying the exterior of the roof skin.

25. Roof as in claim 8, wherein the clamping part is equipped with a broadened, overlay part.

26. Roof according to claim 8, wherein the trim ring is provided with a lower flange at a distance from and extending substantially parallel to the flange for overlying the skin of the roof, and wherein the clamping part is supported on said lower flange.

27. Roof as in claim 26, wherein the clamping part has an essentially V-shaped cross section, one leg of which fits against the trim ring and the other leg of which has an upper edge that engages under a projection of the frame.

28. A displaceable roof, for installation into vehicles, having a frame for seating against the underside of a roof skin of a vehicle so as to be disposed below the roof skin, a seal running along the peripheral area of a roof opening formed in the roof skin and a cover mounted on the frame for displacement between a position closing the roof opening, wherein an edge of the cover is placed on the seal, and at least one position at least partially uncovering the roof opening; wherein a clamping connection is provided as a means for connecting the frame with the roof skin by pressing the frame against the underside of the roof skin, wherein the clamping connection comprises a clamping element and a portion of the roof skin along the periphery of the roof opening, said portion being downturned so as to form a support for said clamping element thereon, and wherein the clamping element is supported on a top side of a flange formed on the downturned portion of the roof skin, a free end of said flange extending from the downturned portion essentially in a parallel relationship to the roof skin in a direction toward the roof opening.

29. Roof as in claim 28, wherein the clamping element has an essentially V-shaped cross section, one leg of which fits against the downturned portion of the roof skin and the other leg of which has an upper edge which engages under a projection of the frame.

30. A displaceable roof, for installation into vehicles, having a frame for seating against the underside of a roof skin of a vehicle so as to be disposed below the roof skin, a seal running along the peripheral area of a roof opening formed in the roof skin and a cover mounted on the frame for displacement between a position closing the roof opening, wherein an edge of the cover is placed on the seal, and at least one position at least partially uncovering the roof opening; wherein a clamping connection is provided as a means for connecting the frame with the roof skin by pressing the frame against the underside of the roof skin, said clamping connection comprising a sheet material trim ring having an outer portion for overlying the exterior of the roof skin and an inner portion for being secured with the frame, said frame having a recess and means lockingly engageable with said frame within said recess for holding said inner portion of the trim ring to said frame in a manner establishing the clamping connection of the frame to the roof skin with the roof skin being disposed between the frame and the outer portion of the trim ring, the lockingly engageable means being received in said recess in a wedge-like manner.

31. Roof as in claim 30, wherein the lockingly engageable means is a clamping element, said clamping element being supported on said inner portion of the trim ring and having an inner edge which engages under a projection of the frame.

32. Roof as in claim 31, wherein said clamping element is of an essentially V-shaped cross section.

33. Roof as in claim 30, wherein said sheet material is a sheet metal.

* * * * *